United States Patent [19]

Maekawa et al.

[11] 4,366,196
[45] Dec. 28, 1982

[54] PLASTIC MOLDING STRIP

[76] Inventors: Tadashi Maekawa, 108-1, inohana, Miyoshi, Miyoshi-cho, Nishikamo-gun, Aichi Pref; Yutaka Watanabe, 1820-3, Minamiyakata, Sakae-cho, Toyoake-city, Aichi Pref., both of Japan

[21] Appl. No.: 277,230

[22] Filed: Jun. 25, 1981

[30] Foreign Application Priority Data

Jul. 1, 1980 [JP] Japan .............................. 55-93237[U]

[51] Int. Cl.³ .......................... B60R 13/04; B32B 7/02
[52] U.S. Cl. .................................... 428/31; 428/122; 428/192; 428/217
[58] Field of Search ................ 428/31, 122, 212, 192, 428/217

[56] References Cited

U.S. PATENT DOCUMENTS 3,811,989  5/1974  Hearn ..................................... 428/31
4,052,522  10/1977 Narita .................................... 428/31
4,220,681  9/1980  Narita .................................... 428/31
4,235,949  11/1980 Van Manen et al. .................. 428/31
4,291,076  9/1981  Katoh .................................... 428/31
4,292,354  9/1981  Katoh .................................... 428/31
4,298,640  11/1981 Katoh ................................... 428/215

Primary Examiner—William J. Van Balen
Attorney, Agent, or Firm—Finnegan, Henderson, Farabow, Garrett & Dunner

[57] ABSTRACT

A plastic molding strip for automotive vehicles including a core member formed of a hard resin plastic material and a molding member formed of a relatively soft plastic material adhered to the core member. Preferably the core member has a C-shaped cross section and is formed of hard vinyl chloride, and the molding member is formed of soft vinyl chloride bonded at least to the outer surface of the C-shaped core member. The material of the core member may include glass fibers as a reinforcement.

3 Claims, 5 Drawing Figures

PLASTIC MOLDING STRIP

BACKGROUND OF THE INVENTION

This application relates to plastic molding strips and, more particularly, to plastic molding strips for automotive vehicles.

It is well-known to use molding strips on the surfaces of automobiles. Such strips serve many practical purposes, such as covering joints that would otherwise be unsightly, weather-stripping the interconnections between the metal body and glass areas, and providing protection to the body and the edges of doors when there may be bumping or scraping between the edge of a door on one vehicle and the body of another vehicle. Molding strips can also be used for decorative purposes.

Such moldings have taken many forms, depending to some extent on the use of the strip and the method of attachment of the strip to the body of the vehicle. One type of such molding includes a resilient base having a substantially C-shaped cross section having inwardly directed flanges. In mounting this type of strip, the flanges may be spread apart against the bias of the resilience and allowed to snap into position behind the edges of an elongated support member.

In one type of such moldings soft vinyl chloride is adhered to a strip of cold rolled carbon steel. As shown in FIG. 1, a thin layer of the vinyl chloride is adhered to the inner surfaces and the flange portion of the C-shaped steel strip as an interface with the metallic surfaces of the vehicle body and the molding support to which the molding strip is attached. It is also known to embed the C-shaped carbon steel strip in a soft plastic by injection molding of the soft plastic about the steel strip.

Molding strips prepared either by adhering the soft vinyl chloride to the cold rolled carbon steel strip or by injection molding of the vinyl chloride on the steel strip provide a good appearance and sufficient strength for protection of the vehicle and for remaining firmly attached to the support. Unfortunately, however, the thin layer of soft vinyl chloride on the inner surfaces of the steel strip tends to wear through after long periods of use, and the exposed cold rolled carbon steel strip subsequently rusts. The thin layer of vinyl chloride wears through more quickly, of course, if the injection molding process is incompletely carried out or other errors in the process of fabricating the molding strip leave the inner layer of vinyl chloride thinner than was intended.

SHORT SUMMARY OF THE INVENTION

It is therefore the primary object of this invention to improve molding strips of the general type described to obviate rusting of the molding in use.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, a hard plastic material is utilized for the C-shaped inner base of the molding strip and a soft plastic, such as soft vinyl chloride, as a molding member is bonded to the hard plastic base. Preferably, the hard plastic is a hard resin material, such as hard vinyl chloride.

The accompanying drawings, which are incorporated in and constitute a part of this specification, illustrate two embodiments of the invention and, together with the description, serve to explain the principles of the invention.

DETAILED DESCRIPTION OF THE PREFERRED EMBODIMENTS

Figure 1:
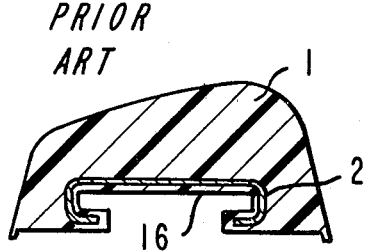
FIG. 1 is a cross-sectional view of a prior art molding.

Referring to FIG. 1, there is shown the prior art device discussed in the Background of the Invention, in which a soft vinyl chloride molding 1 surrounds a core 2 of a cold rolled carbon steel strip, the core having a C-shaped cross section. As stated previously, a relatively thin layer 16 of the soft vinyl chloride covers the inner surfaces of the steel core 2.

The molding strip of the prior art has been manufactured by the steps of forming a roll of cold rolled carbon steel strip, painting an adhesive agent on the strip, activating the adhesive agent, extrusion molding soft vinyl chloride on the activated adhesive agent, cooling, feeding and cutting the molding strip.

According to the present invention, a hard resin plastic is used for the core member. Preferably, the hard resin plastic core is formed of hard vinyl chloride and includes imbedded glass fibers as a reinforcement. Acrylonitrile butadiene styrene or polypropylene are other hard resin plastics which can be used. Under the principles of the invention the occurrence of rust is eliminated and the weight of the molding strip is reduced.

Figure 2:
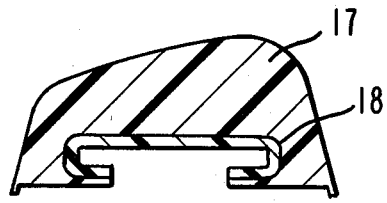
FIG. 2 is a cross-sectional view of one embodiment of the molding strip of the present invention.

An embodiment of the present invention is shown in FIG. 2 in which the molding member 17 covers the outer surfaces of a core member 18, but does not cover the inner surfaces of the core member, which has a C-shaped cross section.

The molding member 17 is formed of a soft plastic material, preferably soft vinyl chloride. The core member 18 as described previously is formed of a hard resin material, such as hard vinyl chloride, acrylonitrile butadiene styrene, or polypropylene.

Figure 3:
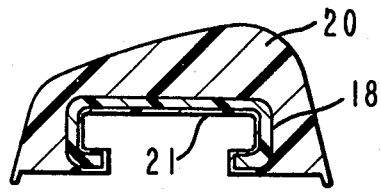
FIG. 3 is a cross-sectional view of a second embodiment of the molding strip of the present invention.

A second embodiment of the present invention is shown in FIG. 3 in which the core member 18 is embedded in a molding member 20. In this embodiment, a thin layer 21 of the soft plastic material covers the inner surfaces of the C-shaped member 18. The thin layer 21, however, can be relatively thinner than the layer 16 of the prior art, since there is no danger of the occurrence of rust if the layer 21 should happen to wear through. The thin layer 21 can be adhered to the inner surfaces or can be formed by injection molding, both as carried out in the prior art and described previously.

As in the embodiment of FIG. 2, it is preferred that the soft plastic material of the molding member 20 be soft vinyl chloride and that the core member 18 be fabricated of hard vinyl chloride reinforced with glass fibers.

Figure 4:
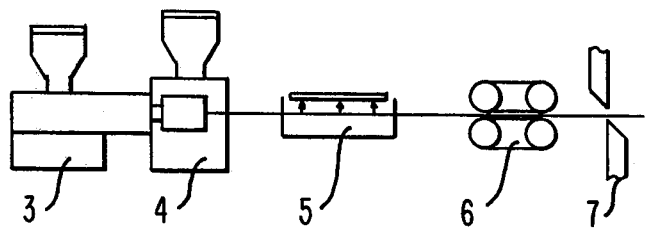
FIG. 4 is a schematic representation of a manufacturing line for the production of the molding strip of FIG. 2.

If desired, the molding strip of the embodiment shown in FIG. 2 may be fabricated by the apparatus shown symbolically in FIG. 4. The resin of the core member 18 is formed by hot extrusion molding by extruding machine 3 and the soft molding material 17 is then bonded to the outer surface of the core member 18 by the extruding machine 4. The thus integrally formed molding strip is cooled at the cooling device 5 and drawn by the feeding device 6 to the cutters 7, where it is cut to size.

Figure 5:
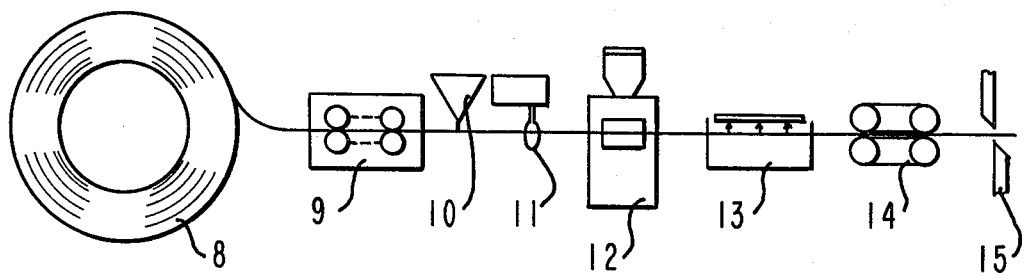
FIG. 5 is a schematic representation of a manufacturing line for the production of the molding strip of FIG. 3.

The molding strip of the embodiment of FIG. 3 may be fabricated by the apparatus illustrated symbolically in FIG. 5 in which a coil 8 of hard resin plastic provides a base for the molding strip. The hard plastic is processed through a hot forming roll 9 and painted by the device 10 with an adhesive. The adhesive is activated by the machine 11 and the hard plastic with activated adhesive is embedded in the soft plastic material of the molding member 20 at an extruding machine 12. The thus-formed molding strip is then cooled at 13 and fed at 14 to the cutters 15, in the same manner shown in FIG. 4 as to process apparatus 5, 6 and 7.

The fabricating apparatus, as illustrated symbolically in FIGS. 4 and 5, is merely representative of apparatus by which the claimed molding strips may be manufactured and is not intended to limit in any way the scope of the invention, as claimed.

What is claimed is:

1. A plastic molding strip for automotive vehicles, the plastic molding strip comprising:
   a core member having a C-shaped cross section and formed of a hard resin plastic selected from the group consisting of hard vinyl chloride, acrylonitrile butadiene styrene, and polypropylene, and
   a molding member formed of soft vinyl chloride bonded directly to a least the entire outer surface of said C-shaped core member, at least the outer surface of the molding member opposite the middle portion of said C-shaped member being exposed to the atmosphere.

2. The plastic molding strip of claim 1 wherein said core member is formed of hard vinyl chloride.

3. The plastic molding strip of claim 2 wherein said hard vinyl chloride core member includes glass fibers as a reinforcement.

* * * * *